(12) United States Patent
Griesmann et al.

(10) Patent No.: US 9,465,963 B2
(45) Date of Patent: Oct. 11, 2016

(54) ARRANGEMENT FOR AND METHOD OF OPTIMALLY ADJUSTING THE SCAN RATE OF SCAN BEAMS GENERATED BY A RADIO FREQUENCY IDENTIFICATION (RFID) TAG READER HAVING AN ARRAY OF ANTENNAS

(71) Applicant: SYMBOL TECHNOLOGIES, INC., Lincolnshire, IL (US)

(72) Inventors: Daniel S Griesmann, Villa Park, IL (US); Randy L Ekl, Lake Zurich, IL (US); Binit Jain, San Jose, CA (US)

(73) Assignee: Symbol Technologies, LLC, Holtsville, NY (US)

( * ) Notice: Subject to any disclaimer, the term of this patent is extended or adjusted under 35 U.S.C. 154(b) by 269 days.

(21) Appl. No.: 14/051,979

(22) Filed: Oct. 11, 2013

(65) Prior Publication Data
US 2015/0102908 A1   Apr. 16, 2015

(51) Int. Cl.
  *H04Q 5/22*   (2006.01)
  *G06K 7/10*   (2006.01)

(52) U.S. Cl.
  CPC ....... *G06K 7/10198* (2013.01); *G06K 7/10316* (2013.01)

(58) Field of Classification Search
  CPC ................. G06K 7/10198; G06K 7/10316; G06Q 10/087; G06Q 10/0833; G06Q 30/02
  USPC .............................................. 340/10.1–10.6
  See application file for complete search history.

(56) References Cited

U.S. PATENT DOCUMENTS

| | | | |
|---|---|---|---|
| 7,492,262 B2 | 2/2009 | Washington | |
| 7,844,505 B1 | 11/2010 | Arneson et al. | |
| 7,859,460 B2 | 12/2010 | Hwang et al. | |
| 8,204,438 B2 | 6/2012 | Patel et al. | |
| 8,451,174 B1 | 5/2013 | Plotke | |
| 2007/0096876 A1* | 5/2007 | Bridgelall | H04B 7/0802 340/10.1 |
| 2009/0146816 A1 | 6/2009 | Patel et al. | |
| 2009/0322489 A1 | 12/2009 | Jones et al. | |
| 2010/0156597 A1 | 6/2010 | Stern et al. | |
| 2011/0320322 A1* | 12/2011 | Roslak | G06K 17/0022 705/28 |
| 2012/0161967 A1* | 6/2012 | Stern | G06K 7/10366 340/572.1 |
| 2013/0099898 A1 | 4/2013 | Bloy | |
| 2013/0106608 A1 | 5/2013 | Griesmann et al. | |
| 2013/0233922 A1 | 9/2013 | Schoening et al. | |

* cited by examiner

FOREIGN PATENT DOCUMENTS

| WO | 2008089374 A2 | 7/2008 |
|---|---|---|
| WO | 2011084435 A3 | 7/2011 |

OTHER PUBLICATIONS

Combined Search and Examination Report dated Mar. 17, 2015 in counterpart UK application GB14172505.0.

*Primary Examiner* — George Bugg
*Assistant Examiner* — Sharmin Akhter

(57) ABSTRACT

Retail items movable from an inventory location at a retail venue through a portal to a retail exit are automatically tracked. The items are individually associated with radio frequency identification (RFID) tags. An RFID tag reader has an array of antennas for generating a multitude of scan beams at an adjustable scan rate. A first set of the beams covers the inventory location, and a second set of the beams covers the portal to determine an exit characteristic of the items that have exited the retail venue. A point-of-sale workstation at the retail venue is operative, independently of the tag reader, for determining a sold characteristic of the items that have been sold. A controller dynamically adjusts the scan rate of the first and second sets of scan beams to an optimal scan rate as a function of the determined exit and sold characteristics.

19 Claims, 3 Drawing Sheets

ARRANGEMENT FOR AND METHOD OF OPTIMALLY ADJUSTING THE SCAN RATE OF SCAN BEAMS GENERATED BY A RADIO FREQUENCY IDENTIFICATION (RFID) TAG READER HAVING AN ARRAY OF ANTENNAS

FIELD OF THE DISCLOSURE

The present disclosure relates generally to an arrangement for, and a method of, automatically tracking items movable through a portal either toward or away from an inventory location, by scanning radio frequency identification (RFID) tags associated with the items with scan beams generated by an RFID tag reader having an array of antennas, such as a phased array antenna, and, more particularly, to optimally dynamically adjusting the scan rate of the scan beams that are scanning the inventory location and the portal to an optimal scan rate.

BACKGROUND

Radio frequency identification (RFID) technology is becoming increasingly important for logistics concerns, material handling and inventory management in retail stores, warehouses, distribution centers, buildings, and like controlled or confined areas. An RFID system typically includes at least one RFID reader, also known as an RFID interrogator, and an RFID tag that is usually attached to, or associated with, an individual item, or to a package for the item. The RFID reader interrogates or scans one or more RFID tags in its coverage range by transmitting a radio frequency (RF) signal, and the RFID tag, which senses the interrogating RF signal, responds by transmitting a return RF signal. The RFID tag either generates the return RF signal originally, or reflects back a portion of the interrogating RF signal in a process known as backscatter. The return RF signal may further encode data stored internally in the tag, such as a number. The return signal is demodulated and decoded by the reader, which thereby identifies, counts, or otherwise interacts with the associated item. The decoded data can denote a serial number, a price, a date, a destination, other attribute(s), or any combination of attributes, and so on.

The RFID tag typically includes an antenna, a power management section, a radio section, and frequently a logic section, a memory, or both. In earlier RFID tags, the power management section included an energy storage device, such as a battery. An RFID tag with an active transmitter is known as an active tag. An RFID tag with a passive transmitter is known as a passive tag and backscatters. Advances in semiconductor technology have miniaturized the electronics so much that an RFID tag can be powered solely by the RF signal it receives. An RFID tag that backscatters and is powered by an on-board battery is known as a semi-passive tag.

The RFID system is often used in an inventory monitoring and tracking application. For example, in order to take inventory of RFID-tagged items in a retail store, it is known to position at least one RFID reader overhead in a controlled area or inventory location, and then, to allow each overhead reader to automatically read whatever tagged items are in the coverage range of each reader. For superior RF coverage, it is known to provide each overhead reader with an array of antennas, such as a phased array antenna, that generates a multitude of scan beams that are steered both in azimuth, over an angle of 360 degrees, and in elevation, over an angle of about 180 degrees.

As advantageous as such known automatic inventory-taking RFID systems utilizing phased array antennas have been, it has proven difficult to optimize reader performance, because there are hundreds of scan beams for each reader, and each scan beam is activated individually and in a fixed sequence. Because only a single scan beam is active at a time, scanning though multiple individual scan beams is likely to be required to energize all the tags in all reachable locations in the coverage range. While one tagged item is being scanned by one scan beam at one location in a venue, the presence, the identity, and the activity of another tagged item in other locations not covered by the one scan beam are not being observed.

More particularly, it is known to utilize an overhead RFID reader with a phased array antenna in a retail venue in which a first group of its scan beams cover an inventory location at which the tagged items are stored in order to determine, for example, a count of how many tagged items are currently at the inventory location, while a second group of its beams cover a portal, zone or exit through which the tagged items are removed from the retail venue in order to determine, for example, a count of how many tagged items have currently exited the retail venue. Both counts are useful information, and it is desired that both counts be accurate and up-to-date. However, the more time spent in scanning and counting by one of these groups, the less time is available in scanning and counting by the other of these groups. Thus, if the RFID reader is busy scanning the inventory location, then it cannot accurately scan the portal. Of course, if more time is allotted to scanning the portal, then the less time is available to accurately determine how many items are in current inventory.

Accordingly, there is a need to efficiently and dynamically adjust the scan rate of the scan beams generated by the RFID reader such that the inventory location and the portal are both adequately covered by the scan beams for sufficient time periods to yield accurate item counts and item identifications.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
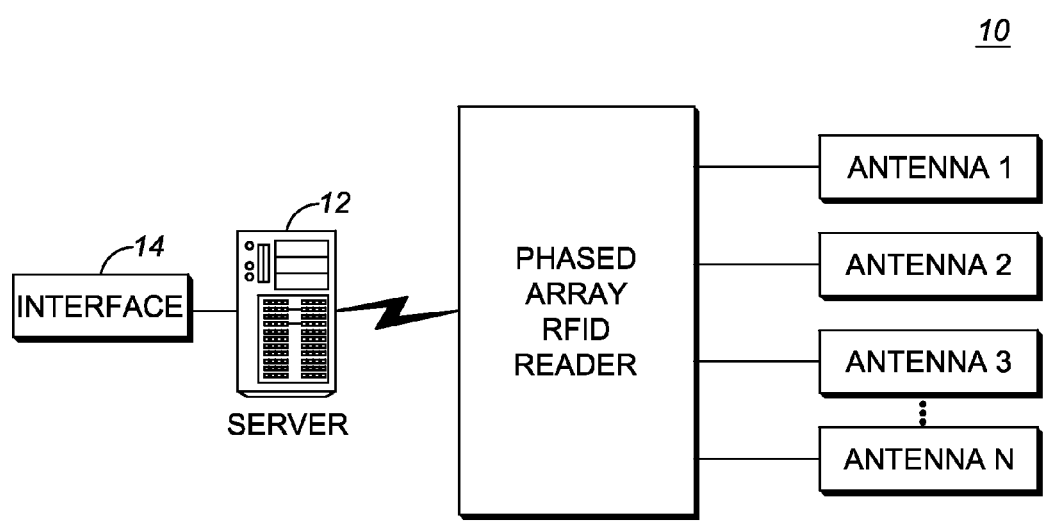
FIG. 1 is a schematic view of an exemplary radio frequency identification (RFID) tag reader having a phased antenna array for generating scan beams whose scan rate is to be adjusted in accordance with the present disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The arrangement and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

One aspect of this disclosure relates to an arrangement for automatically tracking items movable through a portal, either toward or away from an inventory location. As used herein, the term portal signifies a zone or area through which the items are moved. Thus, the term portal can signify an exit or doorway, or an aisle or like passageway. The inventory location may be located in a retail store, a warehouse, or any other area in which RFID-tagged items are to be monitored. The items are individually associated with radio frequency identification (RFID) tags. The arrangement includes an RFID tag reader having an array of antennas, such as a phased array antenna, for generating a multitude of scan beams at an adjustable scan rate. A first set of the beams covers the inventory location to scan and interrogate the tags of items located in the inventory location. A second set of the beams covers the portal to scan and interrogate the tags of items passing through the portal to determine an exit characteristic of the items that have passed through the portal. As used herein, the term exit characteristic signifies a count or quantity of the items that have passed through the portal, as well as one or more identifiers, e.g., identification numbers, which identify the items that have passed through the portal, as well as any other attribute of the items that have passed through the portal. The first and second sets may have one or more of the beams in common, that is, one or more beams may belong to both sets.

The arrangement further includes a workstation operative, independently of the RFID tag reader, for determining a moved characteristic of the items that have been moved, either toward or away from the inventory location. As used herein, the term moved characteristic signifies a count or quantity of the items that have been moved through the portal, as well as one or more identifiers, e.g., identification numbers, which identify the items that have been moved through the portal, as well as any other attribute of the items that have been moved through the portal. For example, at a retail venue, the workstation is a point-of-sale or checkout station, and the moved characteristic would be the number of items sold. A controller is operatively connected to the RFID tag reader and the workstation, for optimally dynamically adjusting the scan rate of the first and second sets of scan beams that are scanning the inventory location and the portal to an optimal scan rate as a function of the determined exit characteristic and the determined moved characteristic.

More particularly, when the exit and moved characteristics are respectively descriptive of exit and moved quantities, then the controller is operative for increasing the scan rate of the second set of the beams, and for concomitantly decreasing the scan rate of the first set of the beams, when the exit quantity is less than the moved quantity by a predetermined proportion. In addition, the controller is operative for decreasing the scan rate of the second set of the beams, and for concomitantly increasing the scan rate of the first set of the beams, when the exit quantity is not less than the moved quantity by the predetermined proportion. Also, when the exit and moved characteristics are respectively descriptive of exit and moved lists that identify the items, then the controller is operative for increasing the scan rate of the second set of the beams, and for concomitantly decreasing the scan rate of the first set of the beams, when not enough items from the moved list are contained in the exit list, and vice versa. Advantageously, the controller periodically and incrementally adjusts the scan rate by predetermined amounts until the optimal scan rate has been reached. When the RFID tag reader has a minimum scan rate limit and a maximum scan rate limit, the controller adjusts the scan rate to not exceed the scan rate limits.

A method, in accordance with another aspect of this disclosure, relates to automatically tracking items movable through a portal, as defined above, either toward or away from an inventory location. The items are individually associated with radio frequency identification (RFID) tags. The method is performed by generating a multitude of scan beams at an adjustable scan rate with an array of antennas of an RFID tag reader, by scanning and interrogating the tags of items located in the inventory location with a first set of the beams covering the inventory location, by scanning and interrogating the tags of items passing through the portal with a second set of the beams covering the portal to determine an exit characteristic of the items that have passed through the portal, by determining, independently of operation of the RFID tag reader, a moved characteristic of the items that have been moved, and by optimally dynamically adjusting the scan rate of the first and second sets of scan beams that are scanning the inventory location and the portal to an optimal scan rate as a function of the determined exit characteristic and the determined moved characteristic.

Turning now to the drawings, FIG. 1 depicts a simplified depiction of a phased array radio frequency identification (RFID) tag reader 10 having a plurality of antennas 1, 2, 3 . . . , N. The reader 10 is connected to a server or controller 12 and a user interface 14. The reader 10, also known as an RFID interrogator or scanner, has an RF transceiver, and the antennas 1, 2, 3, . . . , N emit a multitude of beams or RF waves generated by the transceiver over a coverage range in which RFID-tagged items, e.g., handbags 104, and clothing 106, as well as other items, as depicted in a retail venue depicted in FIG. 2, can be read. The number of beams generated by the antennas may be any integer number, N, where N may be over a hundred or more. In one advantageous embodiment, over four hundred beams are generated by the reader 10.

The controller 12 comprises one or more computers or servers that is in wired, wireless, direct, or networked communication with the interface 14 and with the reader 10. The interface 14 provides a human/machine interface, e.g., a graphical user interface (GUI), that presents information in pictorial and/or textual form (e.g., representations of locations of the reader 10 and the RFID-tagged items 104, 106) to a human user, and to initiate and/or alter the execution of various processes that may be performed by the controller 12. The controller 12 and the interface 14 may be separate hardware devices and include, for example, a computer, a monitor, a keyboard, a mouse, a printer, and various other hardware peripherals, or may be integrated into a single hardware device, such as a mobile smartphone, or a portable tablet, or a laptop computer. Furthermore, the user interface 14 can be in a smartphone, or tablet, etc., while the controller 12 may be a computer, either located at a controlled area 102 (see FIG. 2) containing the RFID-tagged items 104, 106, or remotely at some other location, or can be hosted in a cloud server. The controller 12 advantageously includes a wireless RF transceiver that communicates with the reader 10. For example, Wi-Fi and Bluetooth® are open wireless standards for exchanging data between electronic devices.

Figure 2:
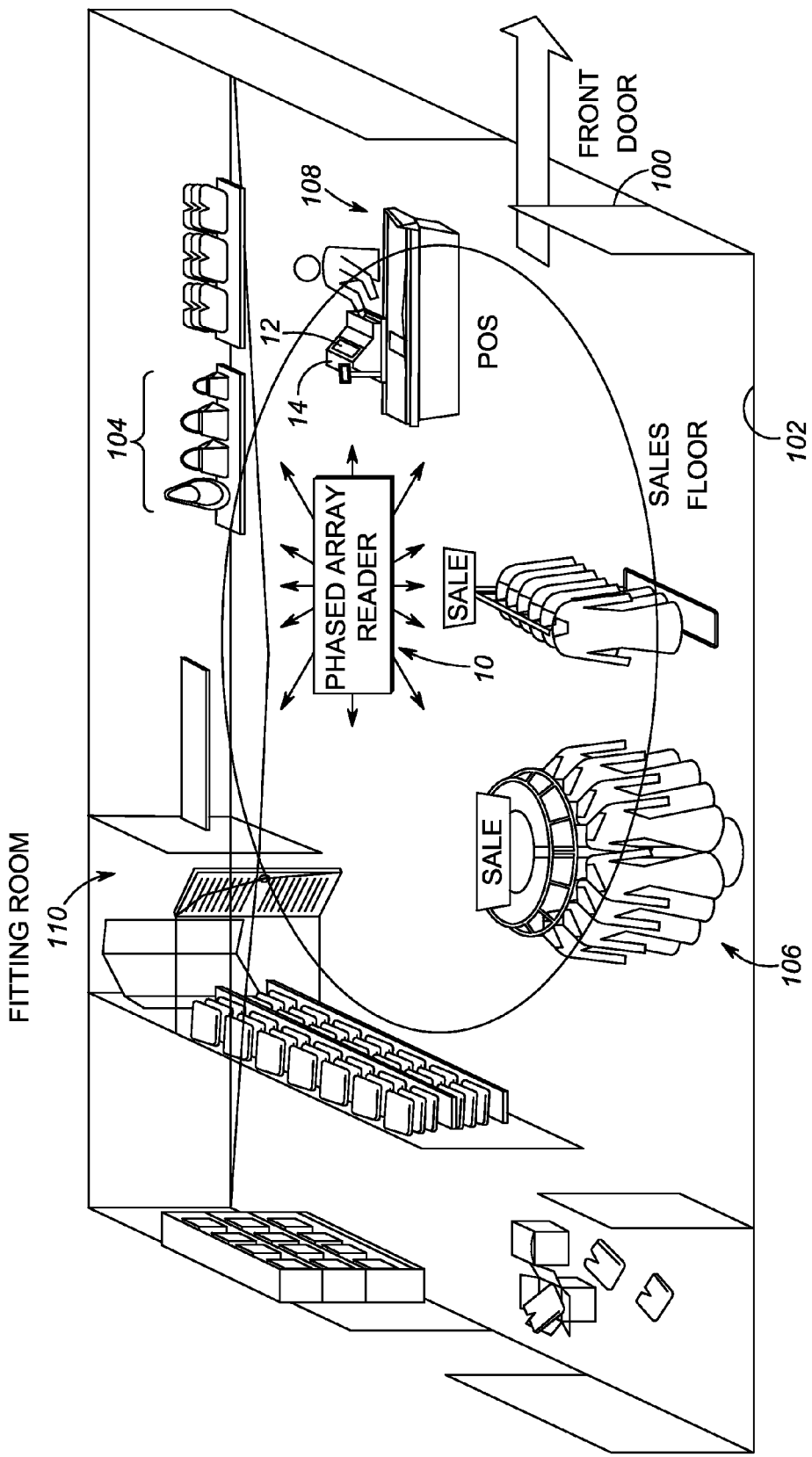
FIG. 2 is a perspective, schematic view of an arrangement for, and a method of, monitoring a retail venue with radio frequency (RF) coverage, especially for inventory control of RFID-tagged items, by using the phased antenna array reader of FIG. 1.

FIG. 2 depicts an exemplary depiction of the reader 10 deployed in a controlled area or inventory location 102 of a retail sales floor having a point-of-sale (POS) or checkout station 108 at which the controller 12 and the interface 14 may be provided, a fitting room 110, and a plurality of RFID-tagged items 104, 106, e.g., clothes, handbags, etc., arranged on shelves, hangers, racks, on the floor, etc. Each RFID-tagged item 104, 106 is preferably associated with a passive tag for cost reasons. Any item 104, 106 checked out at the checkout station 108 is considered sold and is moved and removed from the inventory location 102 via a portal or exit 100 in the direction of the illustrated arrow. To simplify the drawing, only one reader 10 has been illustrated as being preferably located overhead on the ceiling in the controlled area 102. More than one reader 10 to extend the coverage range could be deployed, and not necessarily on the ceiling. The reader 10 may be powered from an electrical outlet, powered over the Ethernet (POE), or can be battery powered.

The scan beams generated from the reader 10, as indicated by arrows extending outwardly therefrom, extend both in azimuth over an angular range of 360 degrees, and in elevation over an angular spread of about 180 degrees. A first group or set of the scan beams covers the inventory location 102 to scan and interrogate the tags of items located in the inventory location 102 in order to determine, for example, a count of how many tagged items are currently at the inventory location 102. A second group or set of the scan beams covers the portal 100 to scan and interrogate the tags of items passing through the portal 100 to determine an exit characteristic of the items that have passed through the portal 100. As used herein, the term exit characteristic signifies a count or quantity of the items that have passed through the portal 100, as well as one or more identifiers, e.g., identification numbers, which identify the items that have passed through the portal 100, as well as any other attribute of the items that have passed through the portal 100. The first and second groups may have one or more of the beams in common, that is, one or more beams may belong to both groups. As described above, each scan beam is activated individually and preferably sequentially. Since only a single scan beam is active at a time, scanning though multiple individual scan beams is likely to be required to energize all the tags in all reachable locations in the coverage range. Thus, when tagged items are being scanned at inventory location 102 by the first group of scan beams, the presence and the activity of other tagged items being scanned at the portal 100 are not being observed, and vice versa.

The checkout workstation 108 is operative, independently of the RFID tag reader 10, for determining a moved or sold characteristic of how many of the items that have been moved and removed from the inventory location 102 and sold. As used herein, the term moved or sold characteristic signifies a count or quantity of the items that have been moved or sold, as well as one or more identifiers, e.g., identification numbers, which identify the items that have been moved or sold, as well as any other attribute of the items that have been moved or sold. The workstation 108 may have an electro-optical reader for reading bar code symbols on the items, or may have another RFID reader for reading tags on the items. In either event, the workstation 108 provides an independent measurement of how many items were moved or sold.

Ideally, the moved or sold characteristic should match the exit characteristic. However, if the RFID tag reader 10 was busy scanning the inventory location 102 at a certain time, then the portal 100 was not being scanned at that time, and it is possible that some tagged items passed through the portal 100 without being read by the second group of beams. One aspect of this disclosure is to adjust the scan rate of the scan beams so that a more accurate count, identity, or other attribute of the items passing through the portal 100 can be obtained, without sacrificing the accuracy of the count, identity, or other attribute of the tagged items currently at the inventory location 102.

The controller 12 is operatively connected to the RFID tag reader 10 and the workstation 108, for optimally dynamically adjusting the scan rate of the first and second groups of scan beams that are scanning the inventory location 102 and the portal 100 to an optimal scan rate as a function of the determined exit characteristic and the determined moved or sold characteristic. More particularly, when the exit and moved characteristics are respectively descriptive of exit and moved quantities, the controller 12 is operative for increasing the scan rate of the second group of the beams, and for concomitantly decreasing the scan rate of the first group of the beams, when the exit quantity is less than the moved quantity by a predetermined proportion. In addition, the controller 12 is operative for decreasing the scan rate of the second group of the beams, and for concomitantly increasing the scan rate of the first group of the beams, when the exit quantity is not less than the moved quantity by the predetermined proportion. Also, when the exit and moved characteristics are respectively descriptive of exit and moved lists that identify the items, then the controller 12 is operative for increasing the scan rate of the second set of the beams, and for concomitantly decreasing the scan rate of the first set of the beams, when not enough items from the moved list are contained in the exit list, and vice versa. Advantageously, the controller 12 is operative for periodically and incrementally adjusting the scan rate by predetermined amounts until the optimal scan rate has been reached. When the RFID tag reader 10 has a minimum scan rate limit and a maximum scan rate limit, then the controller 12 is operative for adjusting the scan rate to not exceed the scan rate limits.

By way of non-limiting numerical example, it will be assumed that an optimized arrangement is one in which the exit quantity is about 95% of the moved or sold quantity. If, however, the exit quantity is about 80% of the moved or sold quantity, then that indicates that more time needs to be spent on scanning the portal 100. In other words, the scan rate for the second group of beams must be increased at the expense of the first group. The controller 12 can incrementally increase the scan rate, say in 2% increments, until the exit quantity is at the optimal scan rate of about 95% of the moved or sold quantity. Analogously, if the exit quantity is about 98% of the moved or sold quantity, then that indicates that too much time is being spent on scanning the portal 100. In other words, the scan rate for the second group of beams must be decreased for the benefit of the first group.

Thus, although the above arrangement has been described and illustrated as being of particular benefit when items are removed from a retail venue through a retail exit, it will be understood that this arrangement can be employed when the items are moved into an inventory location, or from any one inventory location through a portal to another inventory location. Thus, conveyor belts for conveying items between locations are also contemplated as one of the uses of the arrangement.

Another scan rate and sequence optimization with benefit for such an arrangement is one that detects locations where a significant number of never or seldom-seen tags have recently been read. The time spent on scan beams covering those areas can be temporarily increased. Reading a significantly higher number of such tags may indicate that tags are in motion within an area and thus are more likely to be read if and when interrogated. Time spent scanning locations where tags are in motion would also be subject to limits so that other locations continue to be scanned at, or above, a defined minimum scan rate.

Thus, in accordance with another aspect of this disclosure, the arrangement 10 automatically tracks the RFID-tagged items 104, 106 at the location 102, with the RFID tag reader 10 having an array of antennas for generating a multitude of scan beams to scan and read the tags of the items at a scan rate. The controller 12 determines a recent change in the number of the tags of the items that have been read, and optimally dynamically changes the scan rate of the scan beams that are scanning the tags. For example, if the controller 12 determines that, in the past, a number of tags were not read, or were read less frequently, but that, in the present, more tags were currently being read, or were being read more frequently, then the controller 12 will at least temporarily increase the scan rate. By way of numerical example, if one hundred of the handbags 104 were read in the past week, but two hundred of the handbags 104 were being read now (e.g., in the last fifteen minutes), then the scan rate of the beams covering the handbags 104 could be temporarily doubled.

In many cases, the scan rate at which scan beams are scanned can be increased further by eliminating scan beams that do not contribute any or many unique tags from the scan sequence altogether. Significant overlap between scan beams (of a single antenna array as well as multiple antenna arrays) and scan beams that are aimed at locations where no tags are located (e.g., walls) are likely causes of non-contributing scan beams. The controller 12 could optimize the set of scan beams included in the scan sequence. In the preferred embodiment, the controller 12 would calculate the number of unique tags read by various subsets or groups of scan beams, and select only the set that uses the fewest number of scan beams to achieve the highest unique tag count for use in future scanning. An alternate embodiment would eliminate scan beams that are found to read fewer than some fixed characteristic of unique tags from the scan sequence. In both of these embodiments, very infrequent checks of the eliminated scan beams could still be done, to ensure that tags and locations are not skipped forever. If unique tags are then seen in these locations, then the eliminated scan beam would be added back to the scan list. Similarly, if a high level of volatility is seen at a location adjacent to an eliminated beam, then it could be added back.

Each of these methods can be extended to perform optimization of scan sequences of multiple antenna arrays within a system. Note that the limitation of one active scan beam at a time applies only to scan beams belonging to a single antenna array. Therefore, if there are multiple antenna arrays in a system and their scan beams cover some of the same locations, then each antenna array may be able to "fill in" for the others in those locations while they are away scanning other locations. The controller 12 can leverage this property to determine an optimal scan sequence for multiple antenna arrays in synchronous operation so that each location is scanned at the optimal scan rate and time by an RFID tag reader that has time to devote to scan beams that cover it.

Figure 3:
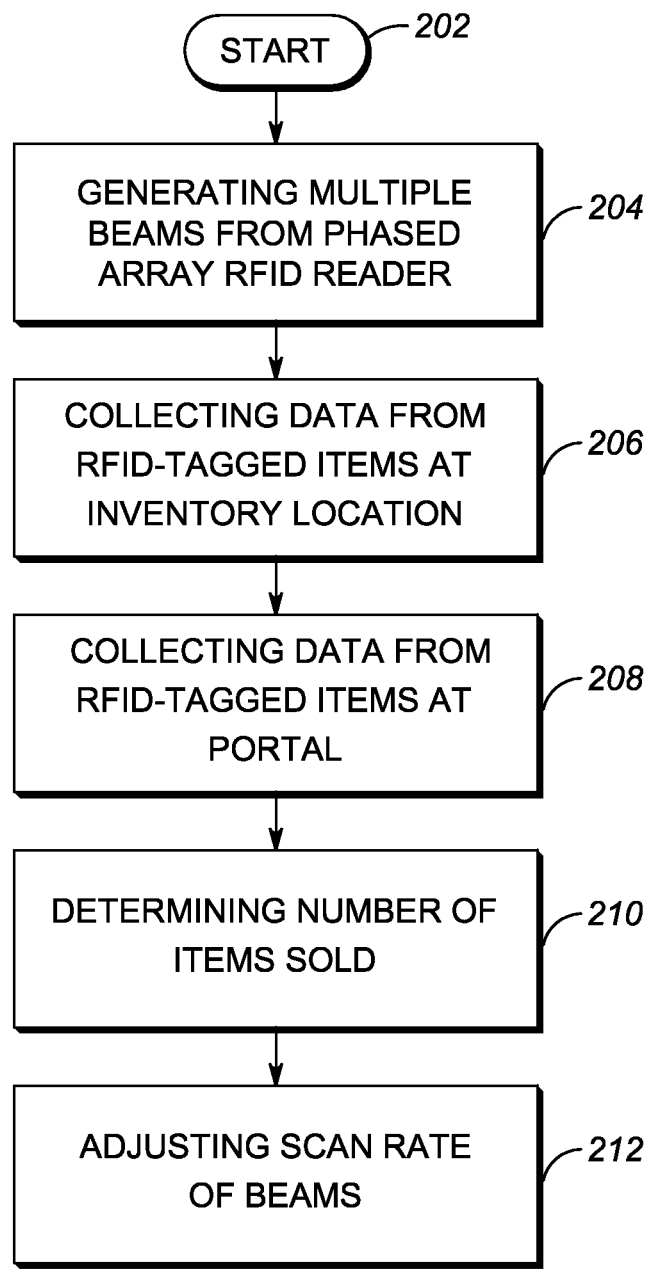
FIG. 3 is a flow chart depicting steps performed in accordance with optimizing the adjustment of the scan rate in accordance with the present disclosure.

As described above, and as shown in the flow chart 200 of FIG. 3, beginning at start block 202, a multitude of scan beams are generated with the phased antenna array of the RFID tag reader 10 at block 204. At block 206, data is collected from the items at the inventory location 102 by scanning and interrogating the tags of the items located in the inventory location 102 with a first set of the beams covering the inventory location 102. At block 208, data is collected from the items at the portal 100 by scanning and interrogating the tags of items passing through the portal 100 with a second set of the beams covering the portal 100 to determine an exit characteristic of the items that have passed through the portal 100. At block 210, the controller 12 determines, independently of operation of the RFID tag reader 10, a moved or sold characteristic of the items that have been moved. At block 212, the controller 12 optimally dynamically adjusts the scan rate of the first and second sets of scan beams that are scanning the inventory location 102 and the portal 100 to an optimal scan rate as a function of the determined exit characteristic and the determined sold characteristic.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An arrangement for automatically tracking items movable through a portal, the items being located at an inventory location and being individually associated with radio frequency identification (RFID) tags, the arrangement comprising:
an RFID tag reader having an array of antennas for generating a multitude of scan beams at an adjustable scan rate, a first set of the beams covering the inventory location to scan and interrogate the tags of items located in the inventory location, and a second set of the beams covering the portal to scan and interrogate the tags of items passing through the portal to determine an exit characteristic of the items that have passed through the portal;
a workstation operative, independently of the RFID tag reader, for determining a moved characteristic of the items that have been moved; and
a controller operatively connected to the RFID tag reader and the workstation, for optimally dynamically adjusting the scan rate of the first and second sets of scan beams that are scanning the inventory location and the portal to an optimal scan rate as a function of the determined exit characteristic and the determined moved characteristic.

2. The arrangement of claim 1, wherein the exit and moved characteristics are respectively descriptive of exit and moved quantities; wherein the controller is operative for increasing the scan rate of the second set of the beams, and for concomitantly decreasing the scan rate of the first set of the beams, when the exit quantity is less than the moved quantity by a predetermined proportion.

3. The arrangement of claim 2, wherein the controller is operative for decreasing the scan rate of the second set of the beams, and for concomitantly increasing the scan rate of the first set of the beams, when the exit quantity is not less than the moved quantity by the predetermined proportion.

4. The arrangement of claim 1, wherein the controller is operative for periodically and incrementally adjusting the scan rate by predetermined amounts until the optimal scan rate has been reached.

5. The arrangement of claim 1, wherein the controller is operative for adjusting the scan rate by varying the number of the scan beams until the optimal scan rate has been reached.

6. The arrangement of claim 1, wherein the RFID tag reader has a minimum scan rate limit and a maximum scan rate limit, and wherein the controller is operative for adjusting the scan rate to not exceed the scan rate limits.

7. The arrangement of claim 1, wherein the workstation is a point-of-sale station having a reader for counting how many of the items that have been moved have been sold.

8. The arrangement of claim 1, wherein the RFID tag reader is mounted at an overhead location at a retail venue having an exit that serves as the portal.

9. The arrangement of claim 1, wherein the RFID tag reader is mounted at a location at a venue having a passage that serves as the portal and through which the items are moved to another inventory location.

10. The arrangement of claim 1, wherein the first and the second sets of beams have at least one beam in common.

11. A method of automatically tracking items movable through a portal, the items being located at an inventory location and being individually associated with radio frequency identification (RFID) tags, the method comprising:
generating a multitude of scan beams at an adjustable scan rate with an array of antennas of an RFID tag reader;
scanning and interrogating the tags of items located in the inventory location with a first set of the beams covering the inventory location;
scanning and interrogating the tags of items passing through the portal with a second set of the beams covering the portal to determine an exit characteristic of the items that have passed through the portal;
determining, independently of operation of the RFID tag reader, a moved characteristic of the items that have been moved; and
optimally dynamically adjusting the scan rate of the first and second sets of scan beams that are scanning the inventory location and the portal to an optimal scan rate as a function of the determined exit characteristic and the determined moved characteristic.

12. The method of claim 11, wherein the exit and moved characteristics are respectively descriptive of exit and moved quantities; wherein the adjusting is performed by increasing the scan rate of the second set of the beams, and by concomitantly decreasing the scan rate of the first set of the beams, when the exit quantity is less than the moved quantity by a predetermined proportion.

13. The method of claim 12, wherein the adjusting is performed by decreasing the scan rate of the second set of the beams, and by concomitantly increasing the scan rate of the first set of the beams, when the exit quantity is not less than the moved quantity by the predetermined proportion.

14. The method of claim 11, wherein the adjusting is performed by periodically and incrementally adjusting the scan rate by predetermined amounts until the optimal scan rate has been reached.

15. The method of claim 11, wherein the adjusting is performed by varying the number of the scan beams until the optimal scan rate has been reached.

16. The method of claim 11, wherein the RFID tag reader has a minimum scan rate limit and a maximum scan rate limit, and wherein the adjusting is performed by adjusting the scan rate to not exceed the scan rate limits.

17. The method of claim 11, and counting how many of the items that have been moved have been sold.

18. The method of claim 11, and mounting the RFID tag reader at an overhead location at a retail venue having an exit that serves as the portal.

19. The method of claim 11, and mounting the RFID tag reader at a location at a venue having a passage that serves as the portal and through which the items are moved to another inventory location.

\* \* \* \* \*